US012806588B2

(12) United States Patent
Stirnimann

(10) Patent No.: US 12,806,588 B2
(45) Date of Patent: Nov. 24, 2026

(54) METHOD AND APPARATUS FOR MONITORING A DRIVE MECHANISM OF AN AUTOMATED INSPECTION SYSTEM FOR INDUCING MOTION TO A CONTAINER PARTIALLY FILLED WITH A LIQUID

(71) Applicant: WILCO AG, Wohlen (CH)

(72) Inventor: Christian Stirnimann, Regensdorf (CH)

(73) Assignee: WILCO AG, Wohlen (CH)

( * ) Notice: Subject to any disclaimer, the term of this patent is extended or adjusted under 35 U.S.C. 154(b) by 888 days.

(21) Appl. No.: 16/972,910

(22) PCT Filed: Jun. 6, 2019

(86) PCT No.: PCT/EP2019/064746
§ 371 (c)(1),
(2) Date: Dec. 7, 2020

(87) PCT Pub. No.: WO2019/234138
PCT Pub. Date: Dec. 12, 2019

(65) Prior Publication Data

US 2021/0245121 A1 Aug. 12, 2021

(30) Foreign Application Priority Data

Jun. 7, 2018 (CH) .................................... 00737/18

(51) Int. Cl.
*B01F 35/21* (2022.01)
*B01F 29/30* (2022.01)
(Continued)

(52) U.S. Cl.
CPC .......... *B01F 35/2134* (2022.01); *B01F 29/30* (2022.01); *B01F 31/20* (2022.01);
(Continued)

(58) Field of Classification Search
CPC ...... B01F 35/2134; B01F 31/20; B01F 29/30; G01F 23/288; G01F 23/292;
(Continued)

(56) References Cited

U.S. PATENT DOCUMENTS 4,087,184 A * 5/1978 Knapp .............. G01N 21/9027 356/239.6
2005/0099625 A1 5/2005 Budd
(Continued)

FOREIGN PATENT DOCUMENTS

DE 40 14 990 A1 11/1991
DE 198 60 901 A1 7/2000
(Continued)

OTHER PUBLICATIONS

Sep. 18, 2019 International Search Report issued in International Patent Application No. PCT/EP2019/064746.
(Continued)

*Primary Examiner* — Hwa Andrew Lee
(74) *Attorney, Agent, or Firm* — Oliff PLC

(57) ABSTRACT

A method and a corresponding apparatus for monitoring a drive mechanism of an automated inspection system for inducing motion to a container partially filled with a liquid. The method includes capturing measurement data of a surface of the liquid in the container, extracting form data regarding a form of the surface of the liquid from the measurement data and detecting whether the container is in motion based on the form data. The apparatus includes a measuring device and a processor operationally connected to the measuring device, wherein the measuring device is adapted to capture measurement data of a surface of the liquid in the container, and the processor is adapted to extract form data regarding a form of the surface from the
(Continued)

measurement data, to detect whether the container is in motion based on the form data.

19 Claims, 3 Drawing Sheets

(51) Int. Cl.

| | |
|---|---|
| ***B01F 31/20*** | (2022.01) |
| ***G01F 23/288*** | (2006.01) |
| ***G01F 23/292*** | (2006.01) |
| ***G01F 23/296*** | (2022.01) |
| ***G01N 21/90*** | (2006.01) |
| ***G06T 7/00*** | (2017.01) |

(52) U.S. Cl.
CPC .......... *G01F 23/288* (2013.01); *G01F 23/292* (2013.01); *G01F 23/296* (2013.01); *G01N 21/9009* (2013.01); *G01N 21/9027* (2013.01); *G06T 7/001* (2013.01)

(58) Field of Classification Search
CPC .............. G01F 23/296; G01N 21/9009; G01N 21/9027; G06T 7/001
See application file for complete search history.

(56) References Cited

U.S. PATENT DOCUMENTS

| | | | | |
|---|---|---|---|---|
| 2005/0248765 | A1* | 11/2005 | Budd ................. | G01N 15/1459 356/427 |
| 2007/0115467 | A1 | 5/2007 | Juvinall et al. | |
| 2008/0001104 | A1* | 1/2008 | Voigt ................. | G01N 21/8851 250/559.46 |
| 2013/0333483 | A1* | 12/2013 | Horoshenkov ..... | G01S 7/52004 73/861.25 |

FOREIGN PATENT DOCUMENTS

| | | | | |
|---|---|---|---|---|
| DE | 10 2010 053 771 | A1 | 6/2012 | |
| EP | 0 418 005 | A1 | 3/1991 | |
| EP | 1 298 428 | A1 | 4/2003 | |
| EP | 3 062 113 | A1 | 8/2016 | |
| GB | 1 524 042 | A | 9/1978 | |
| JP | 2003-098107 | A | 4/2003 | |
| JP | 2005-017004 | A | 1/2005 | |
| WO | WO-2016121449 | A1 * | 8/2016 | ......... G01B 11/0608 |

OTHER PUBLICATIONS

Dec. 8, 2020 International Preliminary Report on Patentability issued in International Patent Application No. PCT/EP2019/064746.

* cited by examiner

METHOD AND APPARATUS FOR MONITORING A DRIVE MECHANISM OF AN AUTOMATED INSPECTION SYSTEM FOR INDUCING MOTION TO A CONTAINER PARTIALLY FILLED WITH A LIQUID

TECHNICAL FIELD

The present invention relates to automated inspection systems, and in particular pertains to a method as well as a corresponding apparatus for monitoring a drive mechanism of an automated inspection system for inducing motion to a container partially filled with a liquid.

BACKGROUND OF THE INVENTION

Automated inspection machines are typically employing after filling containers with liquids in order to check the fill level, verify that the containers are correctly sealed, i.e. not leaking, and to examine whether the content of the container has been contaminated with impurities, which are often manifested as solid particles within the liquid. Furthermore, it is commonly checked whether the containers have defects such as scratches, cracks, deformations, etc. Common liquid containers are bottles and cans, e.g. for beverages, cosmetics or chemicals, as well as vials, ampoules, carpules and syringes for pharmaceutical/medical products. As part of the inspection process the containers are typically rotated, such that they can for instance be viewed from all sides. Frequently they are also rapidly rotated about their vertical axis in order to whirl up and thus make clearly visible unwanted solid particles present within the liquid. Moreover, it is often necessary to rotate containers in order to mix different liquid components contained therein. For this purpose the container to be handled, in particular to be tested, i.e. the unit/device under test, is for instance arranged in a rotation mechanism, e.g. placed on a rotary plate propelled by an electric motor such as a servo drive or stepper motor or clamped between a free-running pressing member and an actuated rotary disc. Alternatively, the containers are agitated in another way than rotating, for instance they may be vibrated, shaken, rattled or swayed, e.g. in order to stir up the liquid within the container.

For correct handling and inspection it must be ensured that the container is actually being rotated, e.g. that the plate/disc is being driven correctly, preferably at the correct speed/rate of rotation. Therefore, it is necessary to verify whether the drive mechanism which is intended to induce motion to the container is operating correctly, i.e. is causing the container to rotate, vibrate, sway from side to side, etc. This is typically achieved by monitoring the drive mechanism itself. For instance, to rotate a container the container is for instance clamped between a driven rotary plate and a pressing member rotatable with the container. Rotation monitoring can be performed by measuring the rotational speed of the rotary plate and comparing the measured rotational speed with a target rotational speed of the rotary plate. This makes it possible to effectively monitor the rotation of the container. However, the required monitoring device can be quite costly and needs extra space to be installed in the inspection machine.

Hence, for certain applications there exists a need for alternative solutions.

SUMMARY OF THE INVENTION

It is an object of the present invention to provide alternative means for monitoring a drive mechanism of an automated inspection system for inducing motion to a container partially filled with a liquid, in particular an alternative motion monitoring method as well as an alternative motion monitoring apparatus. This object is achieved by the method according to claim 1 as well as by the apparatus according to claim 9. Specific embodiments of the method and apparatus according to the present invention are given in the dependent claims.

The present invention provides a method for monitoring a drive mechanism of an automated inspection system for inducing motion to a container partially filled with a liquid comprising the steps of:

- capturing measurement data, in particular image data, of a surface of the liquid in the container;
- extracting form data regarding a form of the surface of the liquid from the measurement data, in particular from the image data;
- detecting whether the container is in motion/in a state of motion, for instance being rotated, vibrated, shaken, rattled or swayed, based on the form data.

Hence, the present invention is particularly well suited when automated vision inspection is already being employed for other purposes and the necessary hardware resources, such as an imaging system (either optical, acoustic or x-ray/high energy radiation based), is available and can additionally be used to perform motion detection/monitoring, in particular by merely including a further software module capable of executing this task.

The present invention has the advantage over prior art solutions which monitor the drive mechanism itself, that motion of the liquid inside the container and therewith of the container containing the liquid is detected. In this way it is ensured that the motion intended to be induced by the drive mechanism to the container and/or to the liquid inside the container is truly effective, i.e. that the container and/or the liquid is really in motion.

In an embodiment of the method capturing measurement data, in particular image data, is performed by one of the following means:

- an optical sensor, more particularly a camera;
- an acoustic (sound) sensor, in particular an ultrasound sensor or a laser-based acoustic sensor;
- an x-ray detector.

In a further embodiment the method further comprises the following step when capturing measurement data, in particular image data, is performed by means of the optical sensor:

- applying bottom lighting and/or top lighting and/or back lighting and/or side lighting and/or front lighting, in particular bottom-angled lighting, top-angled lighting, rear-angled lighting or front-angled lighting, of the container.

In a further embodiment the method comprises the step of applying optical filtering, in particular polarisation or colour filtering.

In a further embodiment the method comprises the step of generating an acoustic/sound signal in a frequency range from 10 Hz to 20 kHz and/or an ultrasound signal in a frequency range from 20 kHz up to 1 MHz in air or up to 25 MHz in the liquid.

In a further embodiment of the method the step of capturing comprises:

- determining a region of interest comprising a section of the container within which at least part of the surface of the liquid is located.

In a further embodiment of the method the step of extracting form data comprises at least one of the following:

determining a form of the surface;

determining a structure of the surface;

determining a contour of the surface;

determining a curvature or slope of the surface;

determining a height difference between a height of the surface at a wall of the container and a height of the surface within a central region of the container, in particular at a longitudinal axis of the container, more particularly at a vertical axis of the container;

determining a height difference between a height of the surface within/at a central region of the container, in particular at a longitudinal axis of the container, more particularly at a vertical axis of the container, and a height of the surface within/at a peripheral region of the container, more particularly between the central region and a wall of the container;

determining a presence of a vortex or swirl or turbulence within the liquid.

In a further embodiment of the method the step of detecting comprises at least one of the following:

determining whether the form of the surface matches a predefined template within a predefined tolerance;

determining whether a curvature radius exceeds a predefined value;

determining whether the height difference exceeds a predefined value.

In a further embodiment of the method the step of capturing and/or the step of extracting comprises applying automated edge detection and/or feature recognition.

In a further embodiment of the method the step of extracting comprises pixel counting, in particular determining a number of pixels within the region of interest having an intensity within a certain predefined (intensity/grey level) interval or above a certain predefined (intensity/grey level) value and comparing the number with a predefined threshold value.

In a further embodiment of the method the step of determining comprises:

determining a strength/speed of motion of the container based on the form data.

In a further embodiment of the method the steps of capturing and extracting are repeated multiple times, in particular at least once, and the step of determining comprises:

determining a change in motion, in particular a change in a strength/speed of motion, of the container based on the form data determined at different times.

As a further aspect of the present invention a method for inspecting a liquid within a container, in particular for identifying (solid) particles present in the liquid, is suggested, comprising inducing motion to the container, for instance rotating, vibrating, shaking, rattling or swaying the container, and further comprising the proposed motion monitoring/detection method according to any one of the embodiments specified above or combinations of these embodiments.

As a further aspect of the present invention a method for mixing a substance and a liquid or for centrifuging a liquid substance in a container is suggested, comprising inducing motion to the container, for instance rotating, vibrating, shaking, rattling or swaying the container, and further comprising the proposed motion monitoring/detection method according to any one of the embodiments specified above or combinations of these embodiments.

Furthermore, the present invention is directed to an apparatus for monitoring a drive mechanism of an automated inspection system for inducing motion to a container partially filled with a liquid, the apparatus comprising:

a measuring device, in particular an imaging device, in particular comprising an imaging sensor;

a processor, in particular an image analysis processor, operationally connected to the measuring device, in particular the imaging device, wherein the measuring device, in particular the imaging device, is adapted to capture measurement data, in particular image data, of a surface of the liquid in the container;

the processor, in particular the image analysis processor, is adapted to extract form data regarding a form of the surface from the measurement data, in particular from the image data, to detect whether the container is in motion/in a state of motion, for instance being rotated, vibrated, shaken, rattled or swayed, based on the form data.

Motion data regarding the state of motion of the container can then be output by the processor, in particular the image analysis processor.

In an embodiment the apparatus further comprises a motion indicator operationally connected to the processor, in particular the image analysis processor, wherein the motion indicator is adapted to indicate, e.g. display, information regarding the state of motion of the container based on the form data.

In a further embodiment of the apparatus the measuring device, in particular the imaging device, comprises at least one of the following:

an optical sensor, more particularly a camera;

a lighting unit adapted to provide bottom lighting and/or top lighting and/or back lighting and/or side lighting and/or front lighting, in particular bottom-angled lighting, top-angled lighting, rear-angled lighting or front-angled lighting, of the container;

an acoustic (sound) source, in particular an ultrasound source;

an acoustic (sound) sensor, in particular an ultrasound sensor, more particularly an ultrasound transducer, or a laser-based acoustic sensor;

an x-ray source;

an x-ray detector.

In a further embodiment the apparatus comprises a lens, in particular an optical wide-angle lens or a telephoto lens or a zoom lens or a macro lens. Alternatively, an electromagnetic lens, e.g. a magnet or electromagnet arrangement, may be employed, for instance to direct or focus the radiation emitted by an x-ray source.

In a further embodiment the apparatus comprises an optical filter, in particular a polarisation or colour filter.

In a further embodiment of the apparatus the acoustic/sound source is adapted to generate an acoustic/sound signal in a frequency range from 10 Hz to 20 kHz and/or an ultrasound signal in a frequency range from 20 kHz up to 1 MHz in air or up to 25 MHz in the liquid.

In a further embodiment the apparatus comprises a pixel counter, in particular adapted to determine a number of pixels within a region of interest having an intensity within a certain predefined (intensity/grey level) interval or above a certain predefined (intensity/grey level) value. The number can then be compared with a predefined threshold value by means of a comparator.

As a further aspect of the present invention an automated inspection system for inspecting a liquid within a container, in particular for identifying (solid) particles present in the liquid, is suggested, comprising a drive mechanism adapted to induce motion to the container, for instance to rotate, vibrate, shake, rattle or sway the container, and further comprising the proposed motion monitoring/detection apparatus according to any one of the embodiments specified above or combinations of these embodiments.

As a further aspect of the present invention an automated system for mixing a substance and a liquid or for centrifuging a liquid substance in a container is suggested, comprising a drive mechanism adapted to induce motion to the container, for instance to rotate, vibrate, shake, rattle or sway the container, and further comprising the proposed motion monitoring/detection apparatus according to any one of the embodiments specified above or combinations of these embodiments.

It is specifically pointed out that combinations of the embodiments described above can result in even further, more specific embodiments.

BRIEF DESCRIPTION OF THE DRAWINGS

The present invention is further explained below by means of non-limiting specific embodiments and with reference to the accompanying drawings, which show the following.

DETAILED DESCRIPTION OF THE INVENTION

Figure 1:
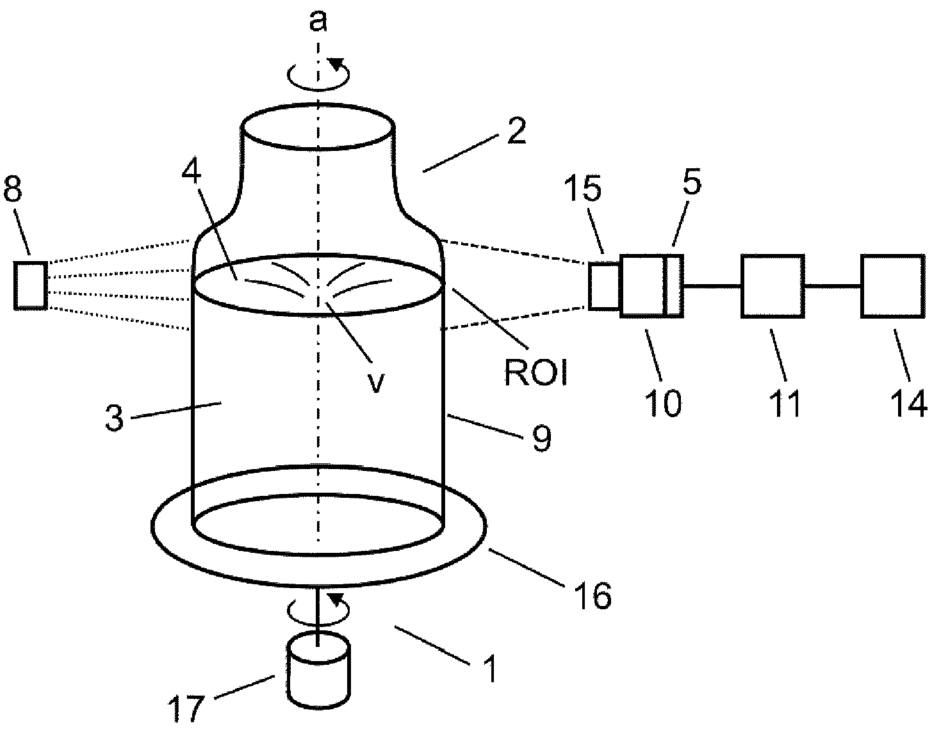
FIG. 1 a conceptual diagram of a first embodiment of the apparatus according to the present invention.

FIG. 1 depicts a conceptual diagram of a first embodiment of the apparatus according to the present invention. The container 2 to be tested is mounted on a rotation mechanism 1 such as a plate or disc 16 propelled by a motor 17 so that the container 2 is rotated about its longitudinal/vertical axis a. If the container is rotating as expected the surface 4 of the liquid 3 within the container 2 will not be flat and horizontal, as is the case when the container 2 is not being rotated and standing still. Instead the liquid 3 will be forced away from the central axis a towards the wall 9 of the container 2 due to the centrifugal force caused by the rotation. Therefore, there will exist a height difference Δh between the surface 4 at the wall 9 and at the axis a. If a strong rotation is applied a vortex v or swirl with a funnel-like shape or more generally strong turbulence will be formed in the surface 4 of the liquid 3.

According to the method of the present invention image data of the surface 4 is captured in order to analyse the form of the surface 4 or to extract a specific feature of the surface 4, such as for instance its curvature, based upon which rotation of the container 2 is detected. In the embodiment shown in FIG. 1 a camera, i.e. an optical sensor 5, is employed as an imaging device 10 to capture the image data. The camera may comprise a lens 15, such as a wide-angle lens or a telephoto lens or a zoom lens or a macro lens, in order to optimally capture a sharp and detailed image of the surface 4 of the liquid 3. Moreover, especially to improve contrast, a lighting unit 8 adapted to provide bottom, top, back, side and/or front lighting of the container 2 may be used. The lighting may be directly coupled into the container 2, e.g. by integrating the lighting unit 8 into the plate or disc 16 onto which the container 2 is arranged/mounted. The material of which the container 2 is made, e.g. glass or plastic, as well as the liquid 3 within the container 2, can act as a waveguide for the light emitted by the lighting unit 8. The lighting unit 8 may emit visible, infrared (IR) or ultraviolet (UV) light. Moreover, an optical filter, such as a polarisation filter or a colour filter, may be arranged at the lighting unit 8 and/or the camera 5, e.g. be attached to the lens 15.

The captured image data is then processed by an image analysis processor 11, which for instance performs edge detection and/or feature recognition, and based on the extracted form data regarding the form of the surface 4 detects whether the container 2 is being rotated. The detected rotation data may then be provided to a rotation indicator 14, which for instance sends a signal to a control unit (not shown) connected to the motor 17.

Figure 2:
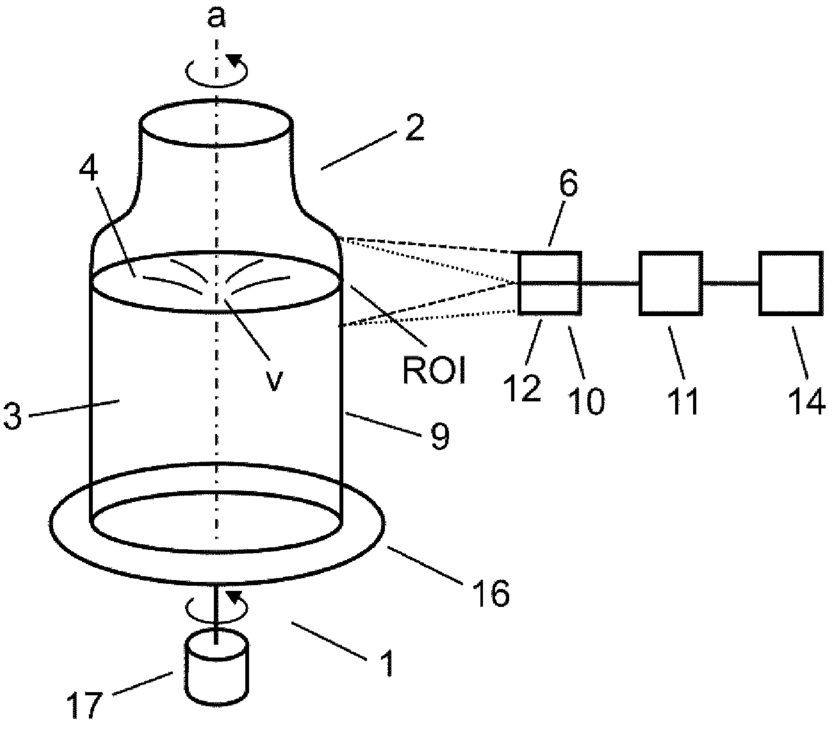
FIG. 2 a conceptual diagram of a second embodiment of the apparatus according to the present invention.

FIG. 2 depicts a conceptual diagram of a second embodiment of the apparatus according to the present invention. In this embodiment an acoustic transducer, i.e. an acoustic/sound source 12 together with an acoustic/sound sensor 6, is employed as the measuring device 10 to capture the measurement data. The sound may be in the hearable frequency range from 10 Hz to 20 kHz and/or an ultrasound signal in a frequency range from 20 kHz up to 1 MHz in air or up to 25 MHz in the liquid. The acoustic sensor 6 may be a laser-based acoustic sensor. The measurement data provided by the acoustic sensor 6 is processed by the processor 11. The measurement data may take on the form of image data (e.g. like a sonar or ultrasound image) that can be processed by an appropriate image analysis processor. This embodiment is especially suited for non-transparent containers, i.e. which do not allow light to pass through the wall 9 of the container 2 or through the liquid 2.

Figure 3:
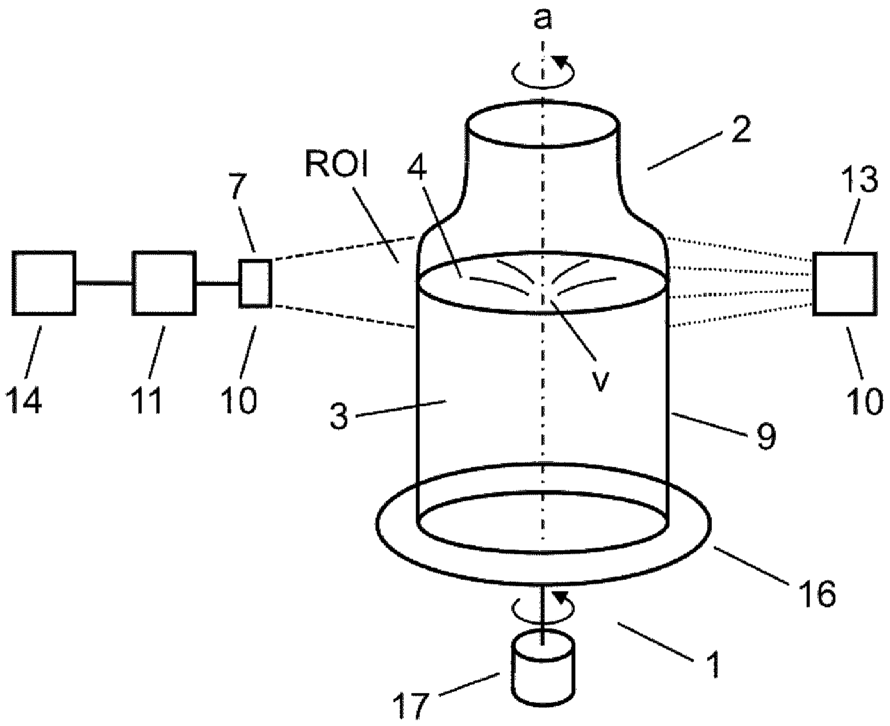
FIG. 3 a conceptual diagram of a third embodiment of the apparatus according to the present invention.

FIG. 3 depicts a conceptual diagram of a third embodiment of the apparatus according to the present invention. In this embodiment an x-ray source 13 (or other high energy radiation source) is employed together with an x-ray detector 7 (or other high energy radiation detector) as the imaging device 10 to capture the measurement data. This embodiment too is especially suited for optically non-transparent containers and/or liquids.

Figure 4:
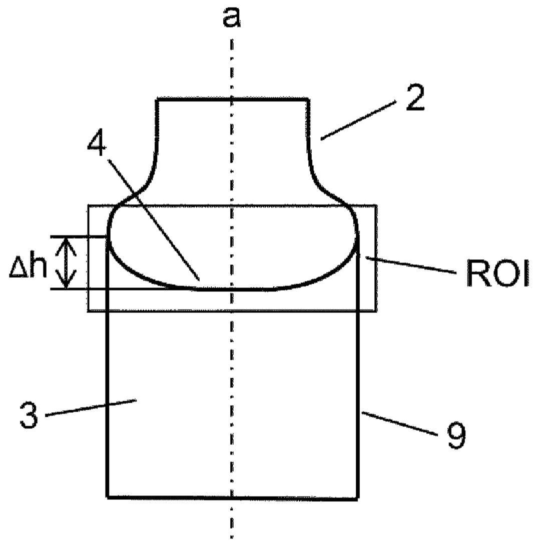
FIG. 4 a cross-sectional view of a container under test with the region of interest encompassing the surface of the liquid contained in the container.

FIG. 4 illustrates a cross-sectional view of a container 2 under test with the region of interest ROI encompassing the surface 4 of the liquid 3 contained in the container 2. Initially, the region of interest ROI may not be known and either needs to be adjusted manually by an operator of the apparatus, or automatically, e.g. with the help of the image analysis processor 11. In FIG. 4 it is clearly visible how the liquid 3 is forced against the wall 9 of the container 2 due to rotation of the container 2, such that the surface 4 of the liquid 3 has a curved form with an increased height of Δh at the wall 9. If the container 2 were swayed side to side there would also be a noticeable height difference Δh of the surface 4 of the liquid 3 between the two opposing walls 9 (as seen in a cross-sectional view of the container 2).

In the examples described above, a rotational motion is induced to the container 2. However, the container 2 can also be arranged/mounted on a plate/disc 16 which agitates the container 2 in some other way, for instance vibrates, shakes, rattles or sways the container 2, e.g. induces a translatory motion, for certain applications.

Figure 5:
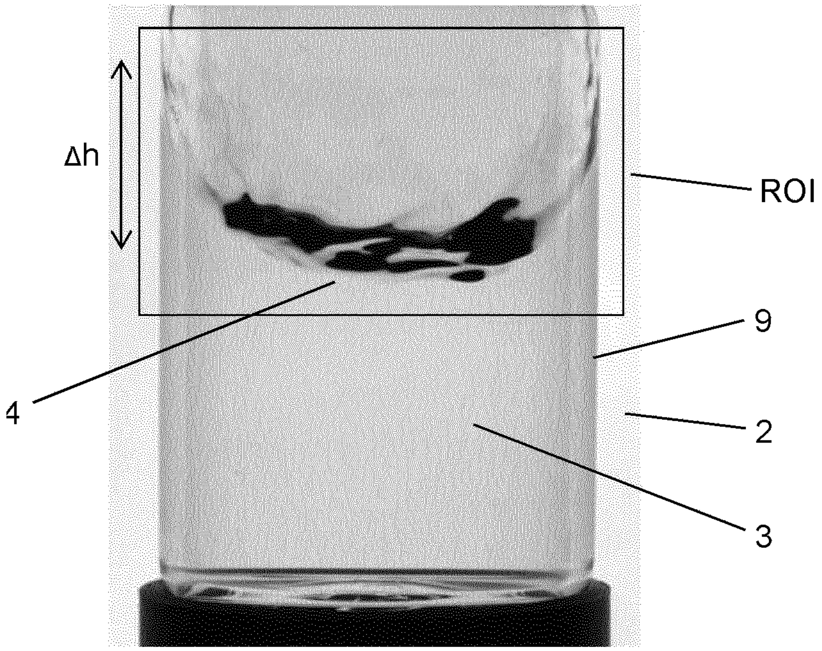
FIG. 5 a photo of a cross-sectional view of a container under test with the region of interest encompassing the surface of the liquid contained in the container.

FIG. 5 shows a photo of a cross-sectional view of a container 2 under test with the region of interest ROI marked as a rectangle. As can be seen the surface 4 of the liquid 3 appears as a dark area in the photo, due to the reflections of the light from the lighting unit 8 (located below the container 2 in this case) on the agitated and therefor turbulent surface 4 of the liquid 3. The region of interest ROI may for instance be partitioned into a plurality of fields by means of a grid and the number of dark (e.g. black) pixels within each field of the grid may be determined using a pixel counter. Subsequently, the position of those fields containing a number of dark pixels exceeding a predefined threshold may be determined, based upon which information regarding the shape or form of the surface 4 is established. From this information it is possible to detect whether the container 2 is being rotated, vibrated, shaken, rattled or swayed (e.g. a specific state or kind of motion). It is even possible to determine the strength of the container's motion, e.g. how fast it is rotating. Additionally, by capturing a sequence of images it is possible to determine whether the strength of motion, e.g. the rate of rotation is changing, i.e. increasing, decreasing, or is steady.

In an especially simple implementation of the present invention employing a pixel counter the number of pixels within the entire region of interest ROI having an intensity above a certain predefined grey (e.g. darkness) level value are determined with the pixel counter (e.g. counts "dark" pixels). If this number exceeds a predefined threshold the liquid 3 and the container 2 are considered to be in motion. The higher the number determined with the pixel counter the stronger the motion of the liquid 3 and of the container 2. Therefore, the strength of the motion can also be determined from the number of dark pixels determined with the pixel counter. An increase of this number over time would therefore indicate an increase in motion of the liquid 3 and therewith of the container 2, and a decrease of this number over time would indicate a decrease in motion of the liquid 3 and therewith of the container 2.

LIST OF REFERENCE SYMBOLS 1 drive mechanism
2 container
3 liquid
4 surface of the liquid
optical sensor, camera
6 acoustic/sound sensor
7 x-ray detector
8 lighting unit with a light source
9 container wall
measurement/imaging device
11 (image analysis) processor
12 acoustic/sound source
13 x-ray source
14 motion/rotation indicator
lens
16 rotatable/movable plate/disc
17 motor/drive
Δh height difference
a longitudinal/vertical axis of the container
ROI region of interest
v vortex/swirl

The invention claimed is:

1. A method for monitoring a drive mechanism of an automated inspection system for inducing a specified motion to a container partially filled with a liquid, the specified motion indicating at least one of rotating, vibrating, or swaying side-to-side, with a preset speed, the method comprising the steps of:

capturing measurement data of a surface of the liquid in the container;

extracting form data regarding a form of the surface of the liquid from the measurement data;

detecting whether the container is in the specified motion based on the form data;

in response to detecting that the container is in the specified motion, determining that the drive mechanism is operating correctly as intended;

in response to detecting that the container is not in the specified motion, determining that the drive mechanism is not operating correctly as intended; and outputting a signal representing a result of the determination on whether the drive mechanism is operating correctly as intended or not, to a motion indicator, the motion indicator displaying a state of the drive mechanism based on the signal, wherein the step of extracting form data comprises determining a curvature or slope of the surface and at least one of the following:

determining a form of the surface;

determining a structure of the surface;

determining a contour of the surface;

determining a height difference between a height of the surface at a wall of the container and a height of the surface within a central region of the container; and determining a presence of a vortex or turbulence within the liquid, and wherein the step of detecting whether the container is in the specified motion based on the form data comprises at least one of the following:

determining whether the form of the surface matches a predefined template within a predefined tolerance;

determining whether a curvature radius exceeds a predefined value; and determining whether the height difference exceeds a predefined value.

2. The method of claim 1, wherein capturing measurement data is performed by an optical sensor.

3. The method of claim 2, further comprising applying bottom lighting, top lighting, back lighting, side lighting, and/or front lighting, of the container.

4. The method of claim 2, further comprising the step of applying optical filtering.

5. The method of claim 1, wherein capturing measurement data is performed by an acoustic sensor, and the method further comprises the step of generating an acoustic signal in a frequency range from 10 Hz to 20 kHz and/or an ultrasound signal in a frequency range from 20 kHz up to 1 MHz in air or up to 25 MHz in the liquid.

6. The method of claim 1, wherein the step of capturing comprises:

determining a region of interest (ROI) comprising a section of the container within which at least part of the surface of the liquid is located.

7. The method of claim 1, wherein at least one of the step of capturing and the step of extracting comprises applying automated edge detection and/or feature recognition.

8. The method of claim 6, wherein the step of extracting comprises pixel counting, determining a number of pixels within the region of interest having an intensity within a predefined intensity interval or above a predefined intensity value and comparing the number with a predefined threshold value.

9. The method of claim 1, wherein the step of determining comprises:

determining a strength of motion of the container based on the form data and determining whether the strength meets the preset speed of the specified motion intended to be induced by the drive mechanism.

10. The method of claim 1, wherein the steps of capturing and extracting are repeated multiple times, and the step of determining comprises:

determining a change in motion of the container based on the form data determined at different times.

11. The method of claim 1, wherein:

the drive mechanism includes a plate and a motor that propels the plate so that the container on the plate is caused to rotate about a longitudinal axis of the plate, and the determination is made solely based on image analysis of the form data without monitoring any physical or control input part of the drive mechanism.

12. The method of claim 1, wherein capturing measurement data is performed by an x-ray detector.

13. An apparatus for monitoring a drive mechanism of an automated inspection system for inducing a specified motion to a container partially filled with a liquid, the specified motion indicating at least one of rotating, vibrating, or swaying side-to-side, with a preset speed, the apparatus comprising:

a measuring device;

a processor operationally connected to the measuring device, wherein the measuring device is adapted to capture measurement data of a surface of the liquid in the container;

the processor is adapted to:

extract form data regarding a form of the surface from the measurement data, detect whether the container is in the specified motion based on the form data, in response to detecting that the container is in the specified motion, determine that the drive mechanism is operating correctly as intended;

in response to detecting that the container is not in the specified motion, determine that the drive mechanism is not operating correctly as intended; and output a signal representing a result of the determination on whether the drive mechanism is operating correctly as intended or not, to a motion indicator, the motion indicator displaying a state of the drive mechanism based on the signal, wherein the extracting the form data comprises determining a curvature or slope of the surface and at least one of the following:

determining a form of the surface;

determining a structure of the surface;

determining a contour of the surface;

determining a height difference between a height of the surface at a wall of the container and a height of the surface within a central region of the container; and determining a presence of a vortex or turbulence within the liquid, and wherein the detecting whether the container is in the specified motion based on the form data comprises at least one of the following:

determining whether the form of the surface matches a predefined template within a predefined tolerance;

determining whether a curvature radius exceeds a predefined value; and determining whether the height difference exceeds a predefined value.

14. The apparatus of claim 13, further comprising the motion indicator operationally connected to the processor, wherein the motion indicator is adapted to display the state of the drive mechanism and transmit a corresponding signal to a controller of the drive mechanism.

15. The apparatus of claim 13, wherein the measuring device comprises at least one of the following:

an optical sensor; and a lighting unit adapted to provide bottom lighting, top lighting, back lighting, side lighting, and/or front lighting, of the container.

16. The apparatus of claim 13, wherein the measuring device comprises:

an x-ray source;

an x-ray detector;

a lens; and an electromagnetic lens, adapted to direct or focus radiation emitted by the x-ray source.

17. The apparatus of claim 15, further comprising an optical filter.

18. The apparatus of claim 13, wherein;

the measuring device comprises:

an acoustic source; and an acoustic sensor, and the acoustic source is adapted to generate an acoustic signal in a frequency range from 10 Hz to 20 kHz and/or an ultrasound signal in a frequency range from 20 kHz up to 1 MHz in air or up to 25 MHz in the liquid.

19. The apparatus of claim 13, further comprising a pixel counter, adapted to determine a number of pixels within a region of interest having an intensity within a predefined intensity interval or above a predefined intensity value.

* * * * *